Figure 3:
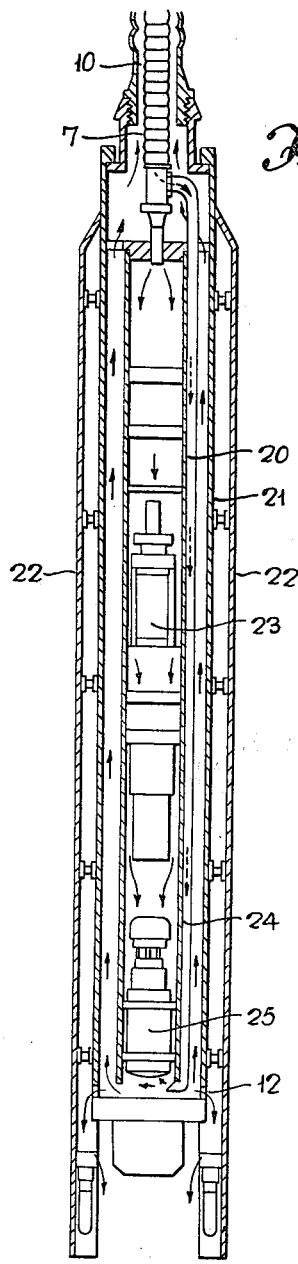

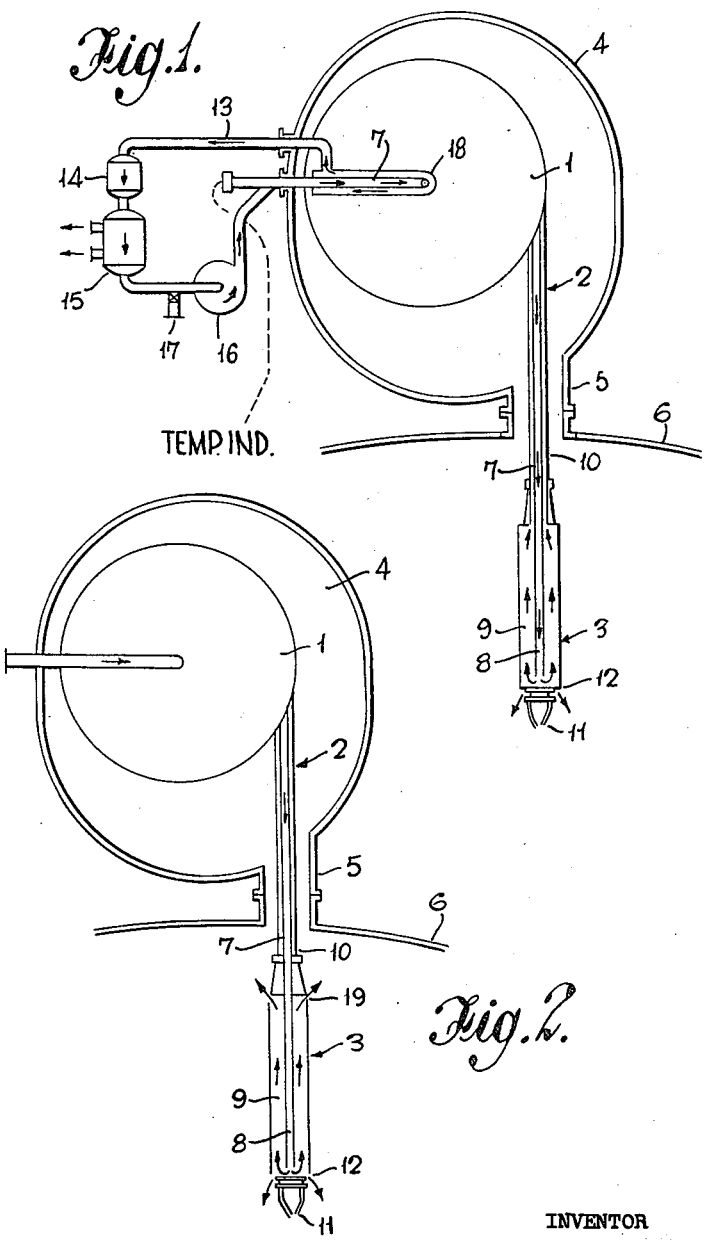

Jan. 22, 1963 G. K. SOAR 3,075,113
REMOTE INSPECTION EQUIPMENT
Filed Feb. 12, 1960 2 Sheets-Sheet 2

INVENTOR
GEOFFREY KEITH SOAR

BY

# United States Patent Office 3,075,113
Patented Jan. 22, 1963

3,075,113
REMOTE INSPECTION EQUIPMENT
Geoffrey Keith Soar, Chelford, England, assignor to A.E.I.-John Thompson Nuclear Energy Company Limited, London, England, a company of Great Britain
Filed Feb. 12, 1960, Ser. No. 8,343
Claims priority, application Great Britain Feb. 19, 1959
6 Claims. (Cl. 313—17)

This invention relates to television camera type inspection equipment for inaccessible locations such as in nuclear reactors.

The invention is applicable both to equipment solely for visual inspection and also to equipment for inspection and manipulation such as that described in co-pending application No. 707,301.

It will be appreciated that the maximum temperature which a television camera will withstand without damage is limited and where it is employed in a location which already has a high temperature, such as the fuel channel of a nuclear reactor, it is very desirable to adopt some precautions against damage.

Normal methods of cooling present difficulty since if additional coolant is discharged into a fuel channel there is a risk of interfering with the normal coolant circulation.

The main object of the invention is to provide improved apparatus which avoids these difficulties.

According to the present invention television camera type inspection equipment for inaccessible locations such as in nuclear reactors is carried in the end of a hollow supporting hose by means of which it can be lowered and raised and means are provided for effecting a forward flow of coolant gas through the hose and television camera and a return flow through an outer path which extends around the camera.

In cases in which the coolant requirement is small the discharge may be into the reactor channel.

In cases in which the coolant requirement is large the return path may be along the hose through an outer path which is concentric with the forward path out from a hose winding drum and the cooling fluid then be recirculated through the inner hose path.

In both cases there may be a limited amount of leakage at the underside of the camera. This is particularly desirable in cases in which handling apparatus is employed as the leakage may serve to cool the handling apparatus.

In arrangements in which there is such leakage the cooling gas must, of course, be the same as the coolant employed in the reactor and may conveniently be $CO_2$ in reactors having a $CO_2$ coolant.

In order that the invention may be more clearly understood reference will now be made to the accompanying drawing, in which:

FIG. 1 shows diagrammatically an embodiment of the invention in which the cooling fluid is circulated around a closed path, FIG. 2 shows an alternative arrangement in which the cooling fluid is discharged into the reactor cooling system, and FIG. 3 is a longitudinal section of the camera structure.

In FIG. 1 the reference 1 indicates a winding drum carrying hose 2 supporting a camera 3. The winding drum 1 is shown located in an auxiliary pressure vessel 4 which is connected by a coupling 5 with the main pressure vessel 6 of the reactor. The forward flow of the coolant is along an inner passage 7 of the hose, down through the inner path 8 of the camera, then back along the outer path 9 around the camera and along the outer passage 10 of the concentric hose. In cases in which handling apparatus 11 is provided a leak may be provided at 12 so that there is a certain amount of leakage flow over the handling apparatus 11 which serves to cool it. The fluid returning along the outer path 10 of the hose passes along the upper duct 13 through a filter 14 and cooling apparatus 15, then through a blower 16 back to the inner passage 7 of the cable. Additional make-up coolant gas may be supplied at 17 to make up for that lost by leakage through the ports 12. The couplings to the hose may be made on the axis of the drum 1 and through suitable rotating joints at 18.

In the alternative arrangement shown in FIG. 2, there is no recirculation of the cooling gas but this is allowed to leak out through ports 19 at the top of the camera casing into the interior of the pressure vessel.

FIG. 3 shows the camera structure in greater detail. This comprises an inner casing 20 and an outer concentric casing 21 which in the particular construction shown carries longitudinal ribs 22. It will, of course, be understood that these ribs may well be omitted in other constructions.

The cooling gas, as previously explained, comes down the inner hose passage 7 and then through the inner casing 20 flowing around the grab drive 23 and the camera 25. At the same time part of the cooling gas is bypassed down a passage 24 which discharges below the camera 25. The return gas path is up the annular space between the casings 20 and 21 and then up the outer cable passage 10.

At the same time the ports 12 allow a gas leak at the lower end of the apparatus.

What I claim is:

1. Equipment for inspecting locations of limited accessibility comprising a television camera, an inner hollow casing enclosing the television camera, a support means for said camera including a flexible tube coupled with said inner casing, a cylindrical winding drum for said tube, an axle member for said drum, surfaces defining a bore to said member communicating with said tube, an outer hollow casing extending co-axially about said inner casing, and means for causing gas coolant to flow successively through said bore, tube and inner casing and then to flow backwardly through the space defined by said inner and outer casings.

2. Equipment for inspecting locations of limited accessibility comprising a television camera, an inner hollow casing enclosing the television camera, a support means for said camera including a flexible tube coupled with said inner casing, a cylindrical winding drum for said tube, an axle member for said drum, surfaces defining a bore to said member communicating with said tube, an outer hollow casing extending co-axially about said inner casing, edges defining gas discharge ports in the upper end of the outer casing, and means for causing gas coolant to flow successively through said bore, tube and inner casing and then to flow backwardly through the space defined by said inner and outer casings and through said discharge ports.

3. Equipment for inspecting locations of limited accessibility comprising a television camera, an inner hollow casing enclosing the television camera, a support means for said camera including a flexible inner tube coupled with said inner casing and a flexible outer tube extending co-axially about said inner tube and defining an annular space therewith, a cylindrical winding drum for said tube, an axle member for said drum, surfaces defining two bores to said member, a first one of said bores communicating with said inner tube, a second one of said bores communicating with said annular space, an outer casing extending co-axially about said inner casing and defining a space therewith communicating with said annular space and with said inner tube, and means for causing gas coolant to flow successively through said first one of said bores, and inner tube and said inner casing and then to flow backwardly through the space defined by said inner and outer casings, the annular space defined by said inner and outer tubes, and said second one of said bores.

4. In equipment for inspecting in locations of limited accessibility and including a detection device, the combination comprising an inner hollow casing for enclosing a detection device, an outer hollow casing extending co-axially about said inner casing and defining a space between said inner and outer casings, support means for said casings including a flexible tube coupled with said inner casing, a cylindrical winding drum for said tube, an axial member for said drum, surfaces defining a bore to said member and communicating with said tube, and means for causing gas coolant to flow successively through said bore, tube, and inner casing and then to flow backwardly through the said space.

5. In equipment for inspecting locations of limited accessibility and including a detection device, the combination comprising an inner hollow casing for enclosing a detection device, an outer hollow casing extending co-axially about said inner casing and defining a space between said casings, edges defining a gas discharge port in the upper end of the outer casing, means for supporting the casings including a flexible tube coupled with said inner casing, a cylindrical winding drum for said tube, an axial member for said drum, surfaces defining a bore to said member and communicating with said tube, and means for causing the gas coolant to flow successively through said bore, tube, and inner casing and then to flow backwardly through the said space and through said discharge ports.

6. In equipment for inspecting locations of limited accessibility and including a detection device, the combination comprising an inner hollow casing for enclosing a detection device, an outer casing extending co-axially about said inner casing and defining a space between said casings, support means for said casings including a flexible inner tube coupled with said casing and a flexible outer tube extending co-axially about said inner tube and defining an annular space therewith communicating with said first mentioned space, a cylindrical winding drum for said tube, an axial member for said drum, surfaces defining at least two bores to said member, the first one of said bores communicating with said inner tube, and the second of said bores communicating with the said annular space, and means for causing a gas coolant to flow successively through said first one of said bores, the inner tube, and the inner casing and then to flow backwardly through the space defined by said inner and outer casings, the annular space defined by said inner and outer tubes, and the said second one of said bores.

References Cited in the file of this patent
UNITED STATES PATENTS

| | | |
|---|---|---|
| 1,630,056 | Buttolph | May 24, 1927 |
| 2,438,830 | Snadecki et al. | Mar. 30, 1948 |
| 2,714,169 | Armistead | July 26, 1955 |
| 2,862,106 | Scherbatskoy | Nov. 25, 1958 |
| 2,888,584 | Hickey | May 26, 1959 |